Feb. 11, 1958 L. GOTTFRIED 2,823,067
DETACHABLE BABY CARRIAGE BODY
Original Filed Feb. 9, 1954 2 Sheets-Sheet 1
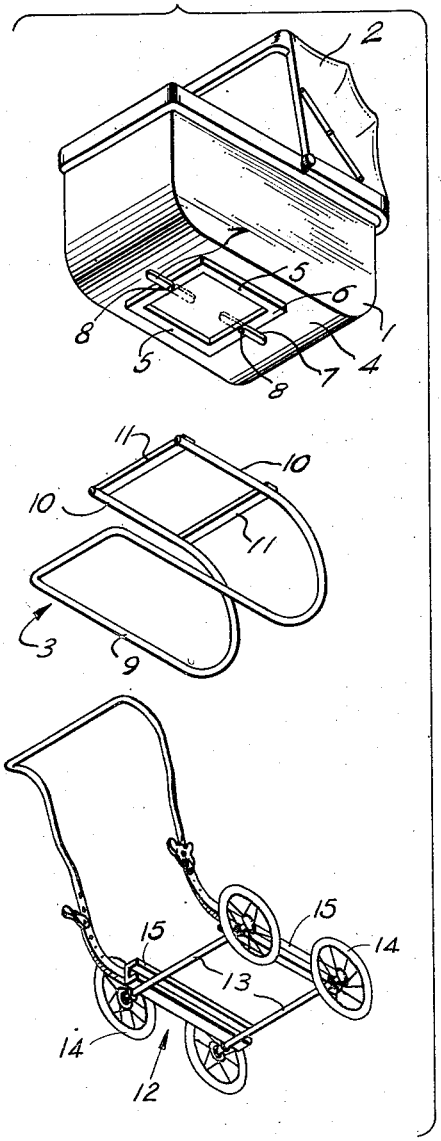
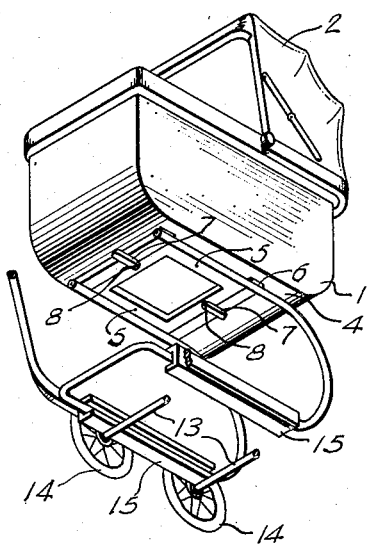
INVENTOR.
Louis Gottfried
BY
ATTORNEY Feb. 11, 1958 L. GOTTFRIED 2,823,067
DETACHABLE BABY CARRIAGE BODY
Original Filed Feb. 9, 1954 2 Sheets-Sheet 2
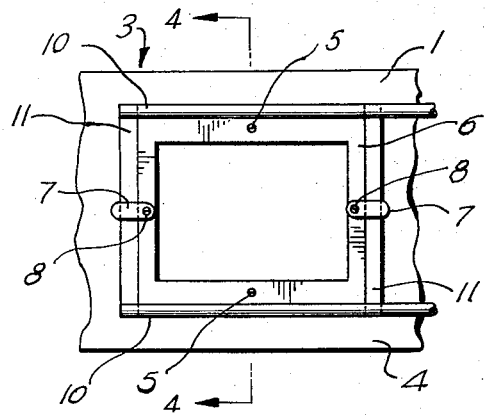
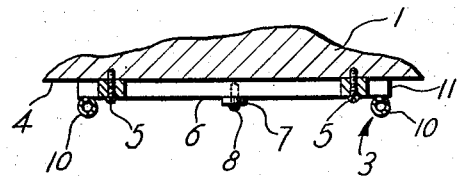
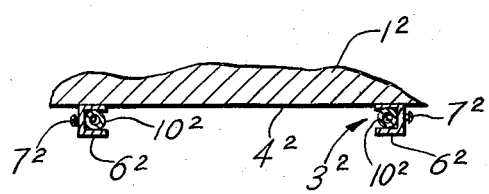
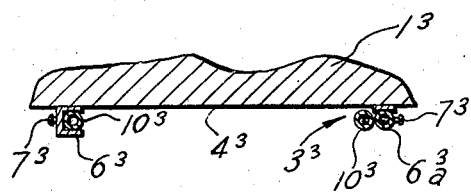
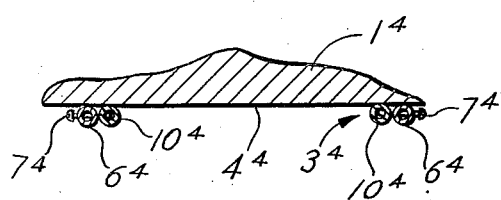
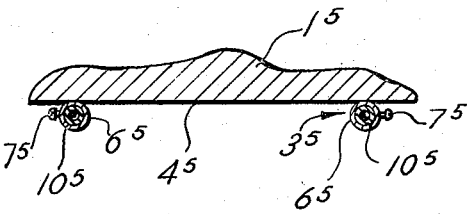
INVENTOR.
LOUIS GOTTFRIED
BY
ATTORNEY

# United States Patent Office 2,823,067
Patented Feb. 11, 1958

2,823,067

DETACHABLE BABY CARRIAGE BODY

Louis Gottfried, New York, N. Y., assignor of one-half to Jacob Berger, New York, N. Y.

Substituted for abandoned application Serial No. 409,094, February 9, 1954. This application July 20, 1956, Serial No. 599,152

7 Claims. (Cl. 296—35)

The present invention relates to detachable baby carriage bodies in general and to such bodies which are removably connected with a running gear in particular.

This is a substitute application for application Serial No. 409,094, filed February 9, 1954, and now abandoned.

Convertible baby carriages are known which comprise two elements, namely a carriage body adapted to receive the baby, to the bottom of which baby carriage body a tubular supporting member is permanently secured, which supporting member includes a U-shaped tubular base, the parallel leg portion of which base being adapted to slide or to be removably secured to a running gear. This structure has the particular advantage that it functions as a complete baby carriage when the carriage body support is attached to the running gear, while upon removal of the carriage body with its support from the running gear, the latter may remain downstairs or in a vestibule of an apartment building, while the carriage body together with its support, permanently secured thereto, is taken upstairs into the apartment of the building. In this case, the support for the carriage body is based on the floor and functions also as support for the baby carriage body while used in the apartment, so that the baby carriage body may function as a crib.

It has been found desirable to use the baby carriage body also inside of a car, which was, however, impossible because the support which is permanently secured to the bottom of the carriage body would not permit to put the entire unit into the car in the first place for lack of space and in the second place also because the support would litf the carriage body comparatively high above the seat, thereby, avoiding proper tending of the baby during travel.

It is, therefore, one object of the present invention to provide a baby carriage body or the like, to the bottom of which a support is releasably secured, which support operates as connecting means between the baby carriage body and the running gear, whereby means are provided for detachably securing the said support to the baby carriage body or the like.

It is another object of the present invention to provide a baby carriage body having a support attached thereto, the bottom of the baby carriage body on one end and the top of the said support on the other end having complementary means which secure the support releasably to the bottom of the baby carriage body or the like, so that the baby carriage body, when secured to said support functions as a bassinet.

It is still another object of the present invention to provide a baby carriage body or the like having a support releasably secured thereto in which the bottom of the baby carriage body has a first frame-like member permanently secured thereto and the top of the support being equipped with a second frame-like member fitting the said first-mentioned frame-like member, and one of the frame-like members having means for retaining the other frame-like member in proper engaging operative position.

It is yet another object of the present invention to provide a baby carriage body or the like having a releasable support therefor, the bottom of the baby carriage body being equipped with a pair of parallel and oppositely disposed channel members or any equivalent members which removably engage complementary members of the upper portion of the support.

With these and other objects in view which will become apparent in the following detailed description, the present invention will be clearly understood in connection with the accompanying drawing, in which:

Figure 1 is an exploded perspective bottom view of a baby carriage body with support and running gear;

Fig. 2 is a perspective bottom view of the baby carriage body with support and the running gear, the latter being partly cut away;

Fig. 3 is a fragmentary bottom plan view of the carriage body;

Fig. 4 is a section along the lines 4—4 of Fig. 3;

Fig. 5 is a fragmentary cross-section disclosing a second embodiment of the connecting means between the bottom of the baby carriage body and its support;

Fig. 6 is a fragmentary cross-section disclosing a third embodiment of such connecting means;

Fig. 7 is a fragmentary cross-section disclosing a fourth embodiment of such connecting means; and Fig. 8 is a fragmentary cross-section disclosing a fifth embodiment of such connecting means.

Referring now to the drawings and in particular to Figs. 1 to 4, the detachable baby carriage body comprises a conventional main body 1 to which a hood 2 is pivotally attached, and a supporting member 3, whereby the body 1 as well as the supporting member 3 include connecting means for detachably securing the supporting member 3 to the main body 1, so that the latter combined with the supporting member 3 functions as a bassinet.

While the supporting member 3 may be secured to any part of the main body 1, it is preferred to secure the supporting member 3 to the bottom wall 4 of the main body 1.

In the embodiment shown in Figs. 1 to 4, the bottom wall 4 has secured thereto by means of screws 5 a frame member 6 to which two oppositely disposed small latch members 7 are pivotally secured by screws, rivets or the like 8, so that the latch members 7 may assume any desirable angular position.

The supporting member 3 is made preferably of tubular material and has a U-shaped base 9, the leg portions of which are bent upwardly and then rearwardly, to form two substantially parallel and about horizontally disposed portions 10, between which horizontal portions 10 cross members 11 are permanently secured thereto. The cross members 11 are spaced apart in such manner that the latter receive the frame member 6 or the cross members 11 may be spaced apart at a width smaller than the frame member 6, the latter receiving in this case the cross members 11. As clearly indicated in Fig. 3 of the drawing, the latch members 7 are turned for about 90° into a position in which they overlap the cross members 11 and, thereby, retain the latter in a position engaging the bottom wall 4 of the main body 1 and simultaneously secure the supporting member 3 to the main body 1.

The running gear 12 comprises in conventional manner two axles 13, each carrying two wheels 14 and channels 15 of U-cross-section are supported by the axles 13, which channels 15 receive the base 9 of the supporting member 3.

While the embodiment of the connecting means between the baby carriage body 1 and the supporting member 3 shown in Figs. 1 to 4 is preferred, Figs. 5 to 8 disclose four additional embodiments for such connecting means.

Fig. 5 shows a second embodiment according to which the main body $1^2$ has secured to its bottom wall $4^2$ two parallel and oppositely disposed channel members $6^2$ which preferably may be equipped with spring biased bolts $7^2$, which channel members are adapted to receive the horizontal portions $10^2$ of the supporting member $3^2$. Such spring biased bolts are disclosed in applicant's patent No. 2,509,972.

The third embodiment shown in Fig. 6 is distinguished over that shown in Fig. 5 merely by an arrangement according to which the main body $1^3$ has secured to one side of its bottom wall $4^3$ a channel member $6^3$ while it carries on the opposite side a tubular member $6a^3$, and spring biased bolts $7^3$ may be provided to retain the horizontal portions $10^3$ of the supporting member $3^3$ in the channel member $6^3$ and adjacent the tubular member $6a^3$, respectively.

The fourth embodiment shown in Fig. 7 comprises two tubular members $6^4$ disposed in parallel arrangement which are secured to the bottom wall $4^4$ of the main body $1^4$, while the horizontal portions $10^4$ of the supporting member $3^4$ are disposed preferably intermediate the two tubular members $6^4$. The spring biased bolts $7^4$ secured to each of the tubular members $6^4$ retain the horizontal portions of the supporting member $3^4$ in supporting position. It is to be understood, of course, that the two horizontal portions $10^4$ of the supporting member $3^4$ may engage the tubular portions $6^4$ on their outer sides, in which case the spring biased bolts $7^4$ are disposed on the inner sides of the tubular members $6^4$.

Finally, the fifth embodiment shown in Fig. 8 discloses tubular portions $6^5$ secured to the bottom wall $4^5$ of the main body $1^5$ and the inner diameter of the tubular members $6^5$ is substantially equivalent or slightly larger than the outer diameter of the horizontal portions $10^5$ of the supporting member $3^5$. Spring biased bolts $7^5$ may be provided additionally on each of the tubular members $6^5$ to retain the horizontal portions $10^5$ of the supporting member $3^5$ in the tubular members $6^5$, thereby, securing the supporting member $3^5$ releasably to the main body $1^5$ of the baby carriage.

While I have disclosed several embodiments of the present invention, it is to be understood that these embodiments are given by example only and not in a limiting sense, the scope of the present invention being determined by the objects and the claims.

I claim:

1. A detachable baby carriage body or the like comprising a main carriage body, a supporting member, and a running gear having four wheels, the said supporting member being removably secured in said running gear and upon removal from said running gear placed on the ground, the said supporting member comprising a base portion and a top portion, the latter being connected with said base portion, the said top portion as well as said base portion of said supporting member including two horizontally disposed parallel portions, means for detachably connecting the said supporting member to the said main body of the baby carriage, and means for detachably connecting said running gear to said supporting member, and said base portion being adapted to be secured to said running gear at about the level of the axis of said wheels, and said horizontal portions of said base portion and of said top portion, respectively, being spaced apart at a distance to raise said top portion above said running gear.

2. The detachable baby carriage body, as set forth in claim 1, in which the said means detachably connecting the said main body to said supporting member comprises a first frame permanently secured to the bottom of the said main body, and a second frame permanently secured to the top portion of the said supporting member, the said first frame being of a configuration complementary to that of the said second frame, and means secured to one of the said frames for retaining the said second frame in engagement with the said first frame, thereby, detachably securing the said supporting member to the said main body.

3. The detachable baby carriage body, as set forth in claim 2, in which the said means for retaining one of said frames in engaging position with the other of said frames comprises latch members pivotally secured to said frame permanently connected with the bottom of said main body, said latch members being adapted to be turned in overlapping position over said frame permanently connected with the upper portion of said supporting member, thereby, retaining the latter in supporting position.

4. The detachable baby carriage body, as set forth in claim 1, in which the said means for detachably connecting said supporting member to said main body comprises channel members disposed in horizontal and parallel arrangement and permanently secured to the bottom of said main body, said channel members being spaced apart at a distance equal to the distance of the said horizontal portions of said supporting member, and said channel members being adapted to receive the horizontal portions of the said supporting member.

5. The detachable baby carriage body, as set forth in claim 1, in which the said means for detachably connecting said supporting member to said main body comprises a channel member secured on one side of the bottom of said main body and a second member secured on the other side of the bottom of said main body in parallel arrangement to said channel member, said channel member receiving one of the said horizontal portions of said supporting member, and the other of said horizontal portions of said supporting member engaging said second member, and means for releasably securing said other of the horizontal portions of said supporting member in engaging position with said second member.

6. The detachable baby carriage body, as set forth in claim 1, in which the said means for detachably connecting said supporting member to said main body comprises two members secured in oppositely disposed arrangement to the bottom of said main body, the said horizontal portions of said supporting member engaging in supporting position the said two oppositely disposed members, and means for releasably retaining said horizontal portions of the said supporting member in engaging position with said two oppositely disposed members.

7. The detachable baby carriage body, as set forth in claim 1, in which the said means for detachably connecting said supporting member to said main body comprises two tubular members secured in parallel arrangement to the bottom of said main body, said tubular members being spaced apart at a distance equal with that of said horizontal portions of said supporting member, and the said tubular members releasably receive said horizontal portions of said supporting member in supporting operative position of said supporting member.

References Cited in the file of this patent

UNITED STATES PATENTS

| 346,398 | Burdick | July 27, 1886 |
| 1,242,446 | Johnson | Oct. 9, 1917 |
| 1,270,086 | Wochner | June 18, 1918 |
| 2,442,889 | Deal | June 8, 1948 |
| 2,509,972 | Gottfried | May 30, 1950 |
| 2,512,995 | Berger | June 27, 1950 |
| 2,645,502 | Collins et al. | July 14, 1953 |

FOREIGN PATENTS

| 94,271 | Germany | Oct. 23, 1897 |
| 1,650 | Netherlands | Oct. 16, 1916 |